Aug. 31, 1965
A. W. GARDES ETAL
3,204,137
ELECTRIC MOTOR CONSTRUCTION
Filed Feb. 20, 1963
2 Sheets-Sheet 1
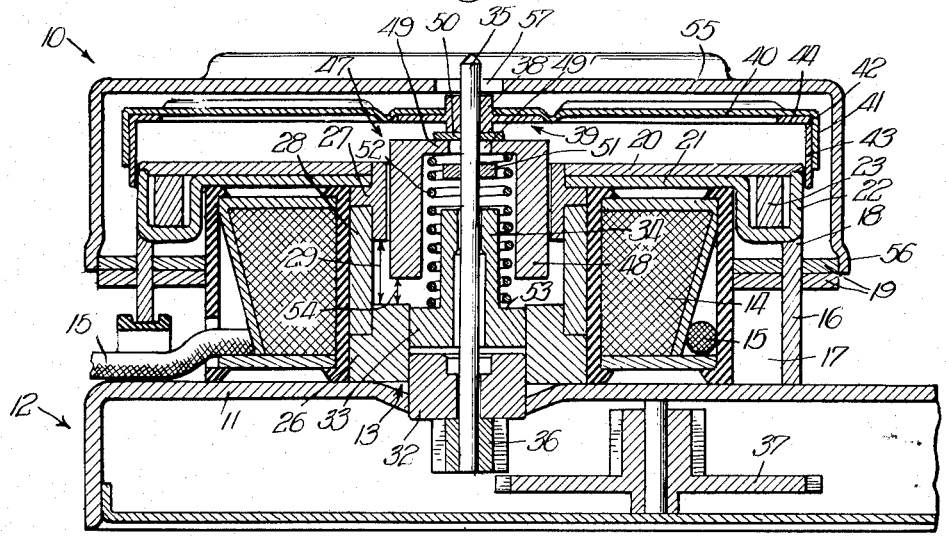
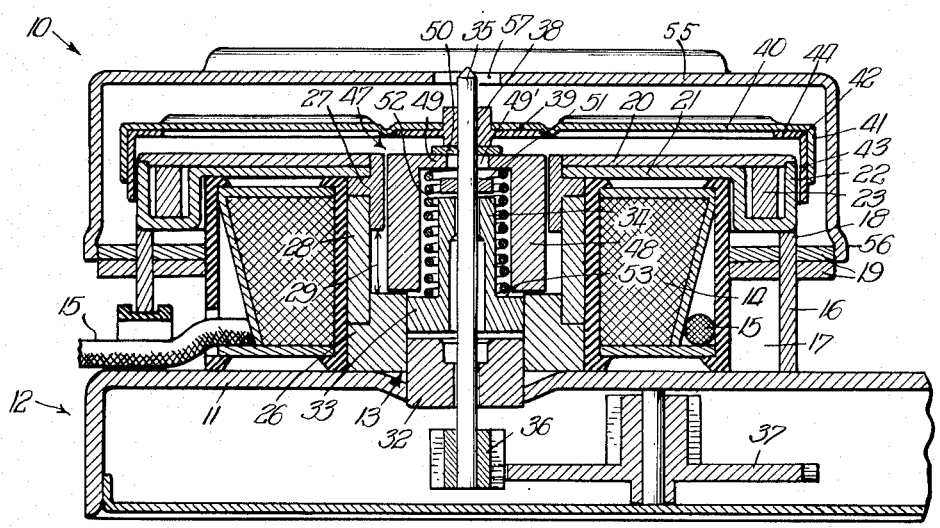
INVENTORS
Alfred W. Gardes,
BY Ted N. Svarnias,
Robert R. Lockwood
attij

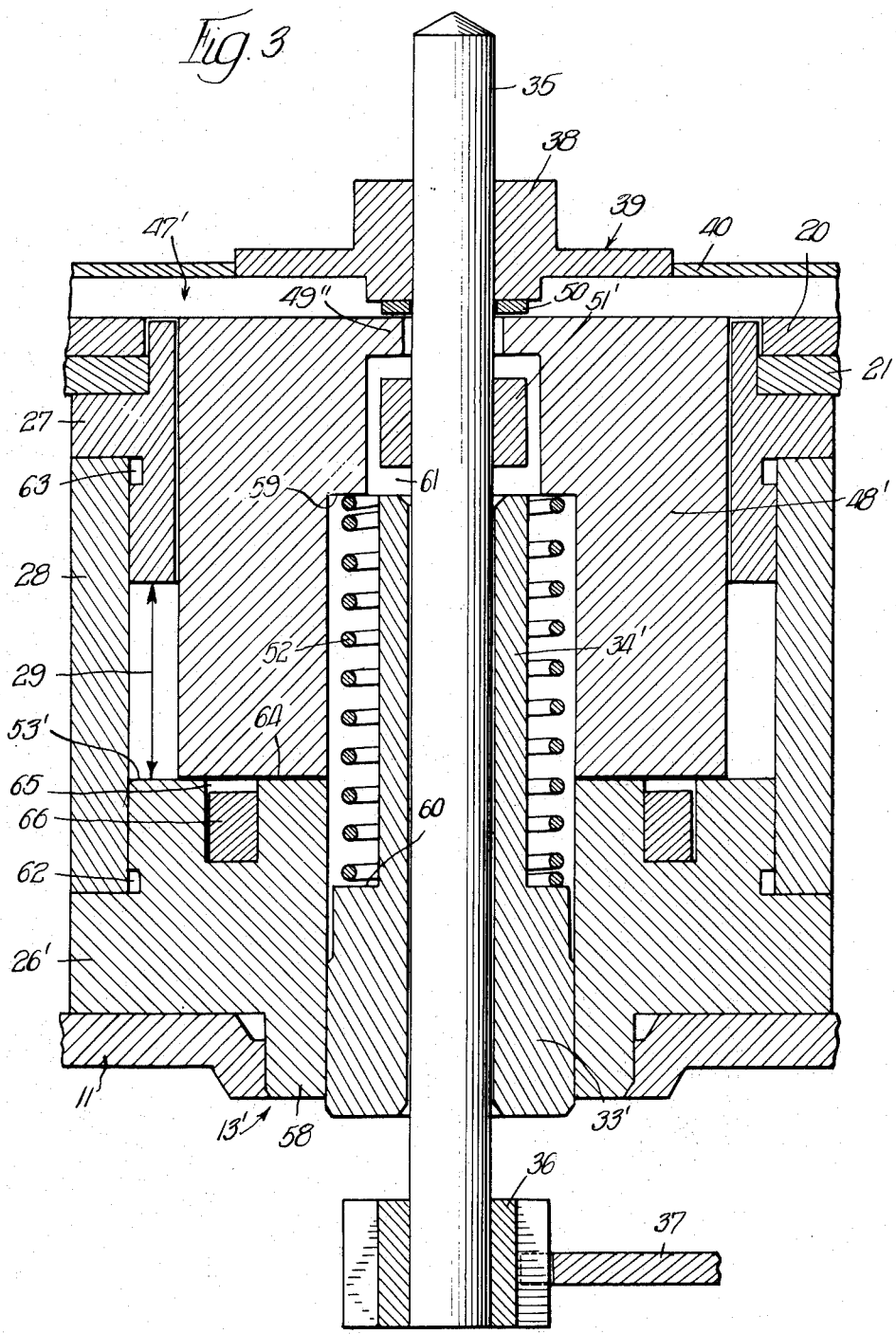

United States Patent Office 3,204,137
Patented Aug. 31, 1965

3,204,137
ELECTRIC MOTOR CONSTRUCTION
Alfred W. Gardes, Evanston, and Ted N. Svarnias, Chicago, Ill., assignors to International Register Company, Chicago, Ill., a corporation of Illinois
Filed Feb. 20, 1963, Ser. No. 259,837
17 Claims. (Cl. 310—164)

This invention relates, generally, to electric motors such as disclosed in U.S. Patent No. 2,615,069, issued October 21, 1952, in the name of W. P. Gallagher and it has particular relation to the mounting of the rotor for such motors.

Among the objects of this invention are: To provide in a new and improved manner for moving a rotor of a motor of this type, together with its shaft and pinion mounted thereon from a normally non-operating position to which they are biased, on energization of the motor field winding to an operating position where the rotor occupies a position of reduced reluctance with respect to the magnetic field and the pinion is in driving engagement with a load, such as a gear train; to provide an air gap in the core of the magnetic circuit surrounding the field winding and for shunting this air gap by an armature coupled to the rotor and shaft for positively moving the pinion into driving engagement with the load regardless of the position of the motor with respect to the direction of the action of the force of gravity on the rotor and parts movable therewith; to couple the armature to the shaft in such manner as to permit readily the former to be held stationary while the latter rotates with the rotor on energization of the field winding; to employ for the armature a cylindrical member of magnetic material within which a coil compression spring is telescoped in concentric relation to the shaft to bias the assembly to the non-operating position when the field winding is deenergized; to reduce noise incident to energization of the field winding by alternating current and movement of the armature to a position adjacent a stationary part of the core of the magnetic circuit; to minimize the effects of remanent magnetism between the armature and the magnetic core after deenergization of the field winding; and to insure that the coil compression spring does not interfere with the movement of the armature, shaft and rotor.

In the drawings:

FIG. 1 is a sectional view, similar to FIG. 3 of the above patent, showing the motor construction with the field winding deenergized and the pinion out of engagement with the gear train.

FIG. 2 is a view, similar to FIG. 1, showing the field winding energized and the pinion in driving engagement with the gear train.

FIG. 3 is a view, at an enlarged scale, showing a modified construction.

Referring now to FIGS. 1 and 2 of the drawings, it will be observed that the reference character 10 designates, generally, a synchronous shaded pole motor of the kind and character shown in the above patent. It includes a plate 11 of magnetic material that forms a part of a gear case that is indicated, generally, at 12. Secured to the plate 11 is an annular magnetic core that is indicated, generally, at 13. The core 13 is materially different from the core of the motor in the patent above referred to and will be described hereinafter. Surrounding the magnetic core 13 is a field winding 14 to which conductors 15—15 are connected for energizing it from a suitable alternating current source such as a source operating at a voltage of 115 volts and a frequency of 60 cycles per second. A magnetic field ring 16 is secured to the plate 11 and is spaced outwardly from the field winding 14 which is located in an annular space 17 defined by the field ring 16. The magnetic field ring 16 is provided with pole tips 18 certain of which are shaded by shading rings 19 as described in the above patent. Extending radially from the other end of the magnetic core 13 are magnetic field plates 20 and 21. They are parallel to the plate 11 and extend over the field winding 14. Along their periphery the magnetic field plates 20 and 21 are provided with pole tips, these being indicated at 22 for the magnetic field plate 21 and arranged to enclose a shading ring 23. When the field winding 14 is energized from an alternating current source of the kind and character referred to, magnetic flux is generated in the magnetic circuit surrounding it which includes the plate 11, magnetic core 13, magnetic field ring 16 and the magnetic field plates 20 and 21. A shifting alternating magnetic field appears between the pole tips on the magnetic field ring 16 and on the magnetic field plates 20 and 21 that is utilized for starting and maintaining rotation of a rotor to be described.

The details of construction of the annular magnetic core 13 differ, as pointed out above, from the construction of the core in the patent above referred to. The core 13 includes an annular core member 26 having a generally L-shaped cross section and it is secured by a suitable welding process to the juxtaposed side of the plate 11. The core 13 also includes an annular core member 27 that has a generally T-shaped cross section and it is to this core member that the magnetic field plates 20 and 21 are secured by a suitable welding operation. Interposed between the core members 26 and 27 is a sleeve 28 of non-magnetic material such as brass. This arrangement provides an air gap 29 in the magnetic core 13 and advantage is taken of it to attract an armature, to be described, on energization of the field winding 14.

A bearing 32 is secured by press fits with the plate 11 and with the annular core member 26. Aligned with the bearing 32 is a bearing 33 having a tubular extension 34. A shaft 35 is journaled in the bearings 32 and 33, the bearing section of the latter being located at the outer end of the tubular extension 34 where it is spaced from the bearing section in the bearing 32 such that the shaft 35 is supported at spaced locations for rotation along the axis of the annular magnetic core 13 and of the field winding 14.

The shaft 35 is not only rotatable in the bearings 32 and 33 but also it is slidable endwise therein. The purpose of this construction is to position a pinion 36, fast on one end of the shaft 35, in or out of driving engagement with a gear 37 of a gear train that is located in the gear case 12 and constitutes a typical load for the motor 10. FIG. 1 shows the pinion 36 out of driving engagement with the gear 37 while FIG. 2 shows them in driving engagement.

At the other end of the shaft 35 a hub 38 is positioned thereon with a press fit. The hub 38 forms a part of a rotor bushing 39 that is formed of non-magnetic material such as brass and it is arranged to have secured thereto the central portion of a rotor 40 that is formed of non-magnetic material such as aluminum. Along its periphery the rotor 40 is provided with a rim 41 for receiving an L-shaped rotor ring 42 of magnetic material which has a press fit therewith. One arm 43 of the rotor ring 42 extends in overlying relation to the outer edge of the magnetic field ring 16 while the other arm 44 extends radially therefrom toward the shaft 35.

Except for the construction of the magnetic core 13 and the bearings 32 and 33, the motor construction thus far described is generally the same as that described in the patent above referred to. On energization of the field winding 14, the rotor 40 tends to move with the shaft 35 along the axis of rotation to a position of minimum reluctance with respect to the magnetic flux that is generated between the pole tips of the magnetic field ring 16 and of the magnetic field plates 20 and 21.

It is desirable that the movement of the rotor 40, shaft 35 and pinion 36 along the axis of rotation of the shaft 35 be substantially independent of the force of gravity thereon and under the control of a force that is substantially greater than the force acting on the L-shaped rotor ring 42 for moving it to the position of minimum reluctance above referred to. For this purpose an armature, shown generally at 47, is coupled to the shaft 35 and thereby to the rotor 40. The coupling is loose and involves a lost motion connection in order to facilitate rotation of the shaft 35 and rotor 40 while the armature 47 is held stationary.

The armature 47 includes a cylindrical body portion 48 of good magnetic material, such as steel, and it has a radially inwardly extending flange 49 at one end that is apertured at 49′ to provide a clearance opening for the shaft 35 that extends therethrough. The flange 49 is positioned between a rotor bearing washer 50, formed of nylon or like material, and a stop member 51 in the form of a brass washer that has a press fit with the shaft 35 and is spaced from the rotor bearing washer 50 so as to provide a loose fit for the flange 49.

In order to bias the shaft 35, rotor 40, pinion 36 and armature 47 to the non-operated position, a coil compression spring 52 is employed. It will be noted that the spring 52 is telescoped over the tubular extension 34 of the bearing 33 and at one end bears against the inner side of the flange 49. At its other end the spring 52 reacts against a shoulder 53 on the bearing 33.

When the field winding 14 is not energized, the coil compression spring 53 acts to bias the shaft 35 and parts movable therewith to the positions shown in FIG. 1. Here it will be observed that an air gap 54 is formed between the juxtaposed surface portions of the annular core member 26 and the body portion 48 of the armature 47. This air gap is in parallel relation to the air gap 29.

When the field winding 14 is energized, not only is the L-shaped rotor ring 42 attracted toward a position of minimum reluctance with respect to the pole tips on the magnetic field ring 16 and on the magnetic field plates 20 and 21 but also the armature 47 is attracted toward the core member 26 with the parts occupying the positions shown in FIG. 2 where the air gap 54, FIG. 1, has been closed. When the armature 47 is moved to the position shown in FIG. 2, the coil compression spring 52 is further stressed and the flange 49 is moved into engagement with the stop member 51 to insure that the shaft 35 and the pinion 36 mounted thereon are moved to position the latter in driving engagement with the gear 37. This action is in addition to the force provided as the result of the magnetic attraction on the L-shaped rotor ring 42. It is particularly advantageous to employ this arrangement when the motor 10 is positioned upside down with respect to the showing in FIGS. 1 and 2. In such an arrangement the force of gravity acts on the rotor 40 and parts movable therewith in a direction to maintain them in the relationship shown in FIG. 1. In addition the coil compression spring 52 acts in the same direction. However, by providing the air gap 29 in the annular magnetic core 13 in the manner described and coupling the armature 47 to the shaft 35, sufficient force is available to move the pinion 36 into driving engagement with the gear 37 even though the magnetic attraction on the L-shaped rotor ring 42 by itself would be insufficient to effect this operation.

When the parts occupy the relationship shown in FIG. 2, the armature 47 is held stationary. Likewise the coil compression spring 52 is stationary. The shaft 35 may oscillate somewhat as limited by the rotor bearing washer 50 and the stop member 51. The rotor bearing washer 50 provides a minimum of friction between the hub 38 and the outer surface of the flange 49 on the armature 47 should the relationship be such as to maintain these parts in close fitting engagement.

A cylindrical cover 55 of suitable non-magnetic material overlies the rotor 40 and has an annular rim that is provided with an outflared rim portion 56 for frictional engagement with one of the shading rings 19. An opening 57 in the central portion of the cover 55 in alignment with the shaft 35 permits it to move therethrough as it moves endwise in the manner described. If desired, the shaft 35 can be extended beyond the cover 55 and a pinion positioned thereon for engagement with a load at this end of the shaft.

FIG. 3 shows a modification in certain details of construction from those illustrated in FIGS. 1 and 2 and described hereinbefore. Insofar as possible the same reference characters are employed in FIG. 3 that are employed in the preceding figures. Where elements are changed the reference characters have been primed in order to indicate the similarity in function.

The annular magnetic core 13′ is somewhat different in construction in that the annular core member 26′ is provided with an extension 58 which has a press fit in the plate 11 that forms a part of the gear case 12. The non-magnetic sleeve 28 has a press fit with the upper portion of the annular core member 26′ and, as before, also has a press fit with the lower portion of the annular core member 27.

The bearing 33′ is arranged at its lower end to have a press fit with the inner surface of the annular core member 26′ including the extension 58 thereof and the tubular extension 34′ provides additional guiding surface for the shaft 35 which carries the pinion 36 at its lower end that drives the gear 37 of the gear train. At its upper end the shaft 35 is provided, as before, with the hub 38 of the non-magnetic rotor bushing 39 to which the rotor 40 is attached.

For assisting in moving the shaft 35 endwise on energization of the field winding 14 the armature 47′ is employed and its cylindrical body portion 48′ has at the upper end a radially inwardly extending flange 49″ the upper surface of which is juxtaposed to the under surface of the rotor bearing washer 50. The arrangement is such that, when the armature 47′ is in the attracted position shown in FIG. 3, the rotor 40 is permitted a slight degree of freedom in movement along the axis of rotation of the shaft 35 in order to permit it to seek a position of minimum reluctance with respect to the magnetic field structure energized by the field winding 14. In order to assist in effecting endwise movement of the shaft 35 on energization of the field winding 14 a stop member 51′, formed of non-magnetic material such as brass, is secured to the shaft 35 and its upper side is arranged to be engaged by the under side of the radially inwardly extending flange 49″.

On energization of the field winding 14, the armature 47′ is attracted to the position shown in FIG. 3 until its movement is arrested on engagement with shoulder 53′ on the annular core member 26′. The air gap 29 between the lower surface of the annular core member 27 and the shoulder 53′ is then shunted by the armature 47′.

When the armature 47′ is attracted to the position shown in FIG. 3, the coil compression spring 52 is further compressed between a shoulder 59 on the armature 47′ and a shoulder 60 on the bearing 33′. It will be observed that this movement is accompanied by movement of the stop member 51′ in a space 61 immediately above the upper end of the tubular extension 34′ and that the space 61 is separated from the space occupied by the spring 52. There is then no likelihood that the movement of the shaft 35 will be interfered with by the spring 52.

It will be recalled that the sleeve 28 is formed of non-magnetic material, such as brass, and that its ends are press fitted to the annular core member 26' and the annular core member 27. Annular grooves 62 and 63 are provided in these core members for the purpose of providing spaces to permit a portion of the material forming the sleeve 28 to flow into the same under the pressure incident to the formation of the press fits.

When the field winding 14 is deenergized, the armature 47' is no longer attracted by its magnetic field and the spring 52 then is free to urge the armature 47' to the deenergized position where the pinion 36 is moved out of driving engagement with the gear 37. In order to avoid any possibility that remanent magnetism in the annular core member 26' and the armature 47' will interfere with the biasing action of the spring 52, a layer 64 of non-magnetic material, such as nickel, is plated over the lower surface of the cylindrical body portion 48' of the armature 47'. Preferably the layer 64 has a thickness of the order of .0002" in order to provide a relatively short air gap while at the same time providing a layer of non-magnetic material between the otherwise juxtaposed surfaces of magnetic material. If desired, the layer 64 can be applied to the upper surface of the annular core member 26'.

With a view to reducing to a minimum the vibration between the annular core member 26' and the armature 47' when the field winding 14 is energized with alternating current, an annular groove 65 is formed in the upper side of the annular core member 26' and a shading ring 66 of good conducting material, such as copper, is inserted therein. This arrangement causes a shifting in the magnetic flux density during successive half cycles of the alternating current with the result that noise incident to the energization of the field winding 14 and attraction of the armature 47' to the annular core member 26' is substantially eliminated.

The motor 10 constructed as disclosed herein functions satisfactorily without regard to its position with respect to the force of gravity. On energization of the field winding 14, sufficient force is applied to the armature 47 or 47' to move the pinion 36 into engagement with the gear 37 and this force is substantially greater than the force exerted by the spring 52 acting with or against the force of gravity. Thus engagement of the pinion 36 with the gear 37 is always assured.

What is claimed as new is:

1. In an electric motor construction in which the magnetic attraction on the rotor on generation of its operating magnetic field is effective to move said rotor from a non-operating position to which it is biased to an operating position where it is in driving relation to a load in combination:
   (a) a magnetic circuit in which said magnetic field is generated operatively associated with said rotor,
   (b) said magnetic circuit having an air gap, and
   (c) an armature coupled to said rotor and movable on generation of said magnetic field to shunt said air gap and assist in moving said rotor from said non-operated position to said operative position.

2. The invention, as set forth in claim 1, wherein the biasing action is provided by a spring capable of overcoming the force of gravity when acting on the rotor and armature when they are positioned such that the force of gravity acts in a direction to move them toward their operative position.

3. The invention, as set forth in claim 1, wherein:
   (a) the rotor is mounted on an endwise movable shaft located along the axis of the magnetic field, and
   (b) the air gap is coaxial with said axis of said magnetic field.

4. The invention, as set forth in claim 3, wherein the armature encompasses and is coaxial with the shaft and has a lost motion connection thereto.

5. The invention, as set forth in claim 4, wherein:
   (a) a spring reacts against the armature to bias it and the rotor to the non-operating position, and
   (b) rotor bearing means are interposed between said armature and said rotor to facilitate rotation of the latter while the former is held stationary by the magnetic field.

6. The invention, as set forth in claim 5, wheren:
   (a) the armature is cylindrical and has a radially inwardly extending apertured flange through which the shaft extends,
   (b) a stop member is secured to said shaft in spaced relation to the rotor bearing means with said flange therebetween, and
   (c) the spring is a coil spring and reacts against the side of said flange opposite said rotor bearing means.

7. An electric motor construction comprising, in combination:
   (a) a magnetic core having an air gap,
   (b) a winding on said core,
   (c) a magnetic plate extending radially from one end of said core,
   (d) a magnetic field ring extending from said plate coaxially with said core and having spaced pole tips therealong,
   (e) magnetic field plate means extending radially from the other end of said core and having pole tips interspersed with said pole tips on said magnetic field ring,
   (f) bearing means carried by said core,
   (g) a shaft journaled in said bearing means to rotate about and move endwise along the axis of said core,
   (h) a rotor fast on said shaft and including a section of magnetic material overlying said pole tips and arranged to be attracted toward the same and to be rotated relative thereto on energization of said winding accompanied by endwise movement and rotation of said shaft,
   (i) a spring biasing said rotor away from said pole tips; and
   (j) an armature coupled to said shaft, positioned within said core, acting to shunt said air gap when said winding is energized, and assisting in said endwise movement of said shaft.

8. The invention, as set forth in claim 7, wherein:
   (a) the armature is movable through the other end of the core toward and away from the one end thereof with the air gap therebetween, and
   (b) the spring is a coil compression spring surrounding the shaft and reacting between said armature and said one end of said core.

9. The invention, as set forth in claim 7, wherein:
   (a) the magnetic core includes an annular core member through which the shaft and bearing means extend and has a surface toward which a surface of the armature is moved on energization of the winding, and
   (b) shading means cooperate with said core member and armature to minimize relative vibration therebetween when said armature occupies its operated position and said winding is energized by alternating current.

10. The invention, as set forth in claim 7, wherein:
    (a) the magnetic core includes an annular core member through which the shaft and bearing means extend and has a surface toward which a surface of the armature is moved on energization of the winding, and
    (b) non-magnetic spacing means is interposed between said surfaces to minimize the effects of remanent magnetism therebetween.

11. The invention, as set forth in claim 8, wherein:
    (a) the armature is cylindrical and has a radially inwardly extending apertured flange through which the shaft extends,
    (b) rotor bearing means are interposed between said flange and the rotor,
    (c) a stop member is secured to said shaft in spaced relation to said rotor bearing means with said flange therebetween, and
(d) the spring reacts against the side of said flange opposite said rotor bearing means.

12. The invention, as set forth in claim 8, wherein:
(a) the armature is cylindrical and has a radially inwardly extending apertured flange through which the shaft extends,
(b) a stop member is secured to said shaft for engagement by said flange on energization of the winding for moving said shaft endwise,
(c) said armature has an annular shoulder spaced from said flange, and
(d) the spring reacts against said shoulder.

13. The invention, as set forth in claim 9, wherein the shading means is in the form of a ring of good conducting metal in a slot in the annular core member adjacent the surface thereof toward which the armature is moved on energization of the winding.

14. The invention, as set forth in claim 10, wherein the non-magnetic spacing means is in the form of a layer of non-magnetic metal secured to the armature.

15. In an electric motor construction in which the magnetic attraction on the rotor on generation of its operating magnetic field is effective to move said rotor from a non-operating position to which it is biased to an operating position where it is in driving relation to a load in combination:
(a) a magnetic circuit in which said magnetic field is generated operatively associated with said rotor,
(b) said magnetic circuit having an air gap,
(c) an armature coupled to said rotor and movable on generation of said magnetic field to shunt said air gap and assist in moving said rotor from said non-operated position to said operative position, and
(d) shading means cooperating with said armature on energization of said magnetic circuit to minimize relative vibration therebetween when said armature occupies its operated position and said magnetic circuit is energized with alternating magnetic flux.

16. In an electric motor construction in which the magnetic attraction on the rotor on generation of its operating magnetic field is effective to move said rotor from a non-operating position to which it is biased to an operating position where it is in driving relation to a load in combination:
(a) a magnetic circuit in which said magnetic field is generated operatively associated with said rotor,
(b) said magnetic circuit having an air gap,
(c) an armature coupled to said rotor and movable on generation of said magnetic field to shunt said air gap and assist in moving said rotor from said non-operated position to said operative position, and
(d) non-magnetic spacing means interposed between said armature and said magnetic circuit when said armature is moved to operated position with respect to said magnetic circuit to minimize the effects of remanent magnetism.

17. The invention, as set forth in claim 16, wherein the non-magnetic spacing means is in the form of a layer of non-magnetic material on the armature.

References Cited by the Examiner

UNITED STATES PATENTS 2,334,040  11/43  Schellens _____ 310—164
3,139,548   6/64  Krischker _____ 310—83

ORIS L. RADER, *Primary Examiner.*

MILTON O. HIRSHFIELD, *Examiner.*